United States Patent [11] 3,566,157

[72] Inventor Lincoln Ong
Verona, Pa.
[21] Appl. No. 745,304
[22] Filed July 16, 1968
[45] Patented Feb. 23, 1971
[73] Assignee Westinghouse Air Brake Company
Swissvale, Pa.

[54] LOAD DRIVING CIRCUIT EMPLOYING A CONTROL GATE TO PREVENT OVERLOADING

12 Claims, 3 Drawing Figs.

[52] U.S. Cl. .......... 307/252, 307/248, 307/284, 307/305
[51] Int. Cl. .......... H03k 17/00
[50] Field of Search .......... 307/252, 305, 284; 307/252, 248, 284, 305

[56] References Cited

UNITED STATES PATENTS

| | | | |
|---|---|---|---|
| 3,209,174 | 9/1965 | Cole | 307/284 |
| 3,282,632 | 11/1966 | Arsem | 307/284 |
| 3,290,581 | 12/1966 | Hooper | 307/284 |
| 3,324,313 | 6/1967 | Sovoka | 307/284 |
| 3,458,730 | 7/1969 | Gamblin | 307/284 |

*Primary Examiner*—Donald D. Forrer
*Assistant Examiner*—Larry N. Anagnos
*Attorneys*—W. L. Stout and Harold Williamson

ABSTRACT: This invention relates to a unique load driving circuit including a load, a power gate, directly connected to the load, a commutation gate connected to the load through an energy storage device, and an energy storage control gate which operates in conjunction with the energy storage device for permitting commutation of the power gate and for causing self quenching of the commutating gate thereby preventing excessive current from flowing through the load due to simultaneous operation of the power gate and control gate.

INVENTOR
Lincoln Ong.
BY W. L. Stout.
HIS ATTORNEY

INVENTOR
Lincoln Ong.
BY
W. L. Stout
HIS ATTORNEY

LOAD DRIVING CIRCUIT EMPLOYING A CONTROL GATE TO PREVENT OVERLOADING

My invention relates to a unique controlled current delivery circuit.

More specifically, my invention relates to a new and improved controlled current delivery circuit which includes a control pulse train source, a power source, a load, the current through which is to be controlled, a power control gate, an energy storage means, an energy storage control gate, and a commutating gate.

The above-noted power control gate is respectively electrically coupled to the above-noted control pulse train source, the load, and the power source. The delivery of current to the load is controlled by the power control gate to allow the current to pass through the load when ever a control pulse appears.

The above-noted energy storage means is respectively electrically coupled to the power control gate and to the energy storage control gate. The energy storage control gate is electrically coupled to the power source and the control pulse train source to thereby allow the storage of energy in the energy storage means whenever a control pulse also appears.

The aforementioned commutating gate is respectively electrically coupled to the power control gate, the energy storage means, and the control pulse train source so that whenever a control pulse disappears, the commutating gate allows the passage of the above-noted storage of energy through the commutating gate to thereby ensure the turnoff of the power control gate.

Generally, in previous types of controlled current delivery circuits using a pair of silicon controlled rectifiers, one of the rectifiers was employed for gating power to the circuit load while the other rectifier was employed for producing commutating action. It has been found, in these prior arrangements, that there is the constant risk of a complete circuit failure when both the power silicon controlled rectifier and the commutating silicon controlled rectifier happen to conduct simultaneously. That is, a complete circuit failure may arise even in the absence of catastrophic failures of any other circuit components. The above-noted risk arises because of the fact that in such prior art circuits the turning off of the commutating silicon controlled rectifier depends upon the turning on of the power silicon controlled rectifier and vice versa. The possibilities of mishaps which may cause both the power silicon controlled rectifier and the commutating silicon controlled rectifier to conduct simultaneously are generally produced either by the "cross talk" talk from unrelated circuits, transient voltages caused by lightning, induction, static, switching surges, or by other extrinsic interferences. In fact, when such mishaps occur, there is no way of turning off the silicon controlled rectifiers except by physically breaking the power line which is not only costly but also time consuming. For example, when the circuit load is an electrical motor field, the motor field current is controlled by a power silicon controlled rectifier which is commutated by a commutating silicon controlled rectifier. That is, the silicon controlled rectifiers are pulse-width modulated by square-wave control pulse signals in such a manner that the leading edge of each pulse effectively turns on the power silicon controlled rectifier while the trailing edge of each pulse effectively turns on the commutating silicon controlled rectifier which, in turn, turns off the power silicon controlled rectifier. However, if the commutating silicon controlled rectifier starts into its conductive condition and a spike or a surge due to an external influence causes the power silicon controlled rectifier to be turned on, the current through the motor field would continue to build up and may reach destruction proportions so that the motor would eventually burn out. Accordingly, it will be appreciated that such controlled current delivery circuits fall short of the necessary and required operation, and that these prior art arrangements can become quite costly from the standpoint of service and repair.

It is therefore an object of this invention to provide a unique controlled current delivery circuit which is economical and inexpensive to construct as well as to maintain.

Another object of this invention is to provide a new and improved controlled current delivery circuit which is free from current overloading due to extrinsic interference.

Yet another object of this invention is to provide an improved controlled current delivery circuit which efficiently controls the amount of current through a load by employing a power control gate and a commutating control gate which positively ensures turnoff of the aforementioned power control gate due to unique functional operation of an energy storage means and an energy storage control gate.

Still another object of the present invention is to provide a new and improved controlled current delivery circuit which is simple in construction, economical in cost, and efficient and reliable in operation.

In the attainment of the foregoing objects, a controlled current delivery circuit has been developed which includes in combination therewith a load, the current through which is to be controlled, a control pulse train source, a direct current power source, a commutating silicon controlled rectifier, a power silicon controlled rectifier, a switching transistor, a blocking diode, a commutating capacitor, and a current-limiting resistor. The control pulse train source selectively produces square-wave or rectangular pulses having a width which is dependent upon the desired amount of current to be passed through the load. A differentiating or derivative-taking means is electrically coupled to the output of the control pulse train source for generating both positive and peaked waves. The commutating silicon controlled rectifier has a gate, an anode, and a cathode electrode. The gate electrode is electrically coupled to the output of the differentiating means through an inverting means while its cathode electrode is directly coupled to one terminal of the direct current power source. The power silicon controlled rectifier also has a gate, an anode, and a cathode electrode. Its gate electrode is directly coupled to the output of the differentiating means while its anode electrode is electrically coupled to the load, the current through which is to be controlled, and its cathode electrode is directly coupled to the one terminal of the direct current power source. The base electrode of the switching transistor is directly coupled to the output of the control pulse train source. The blocking diode has its anode electrically coupled to the emitter electrode of the switching transistor. The commutating capacitor has first and second plates, the first plate respectively electrically coupled to the cathode of the blocking diode and the anode electrode of the commutating silicon controlled rectifier. The second plate is electrically coupled to the junction point between the load and anode electrode of the power silicon controlled rectifier. The current-limiting resistor is interposed between the other terminal of the direct current power source and the collector electrode of the switching transistor to thereby limit the current through the switching transistor.

Other objects and advantages of the present invention will become apparent from the ensuing description of illustrative embodiments thereof, in the course of which reference is had to the accompanying drawings in which.

Figure 2:
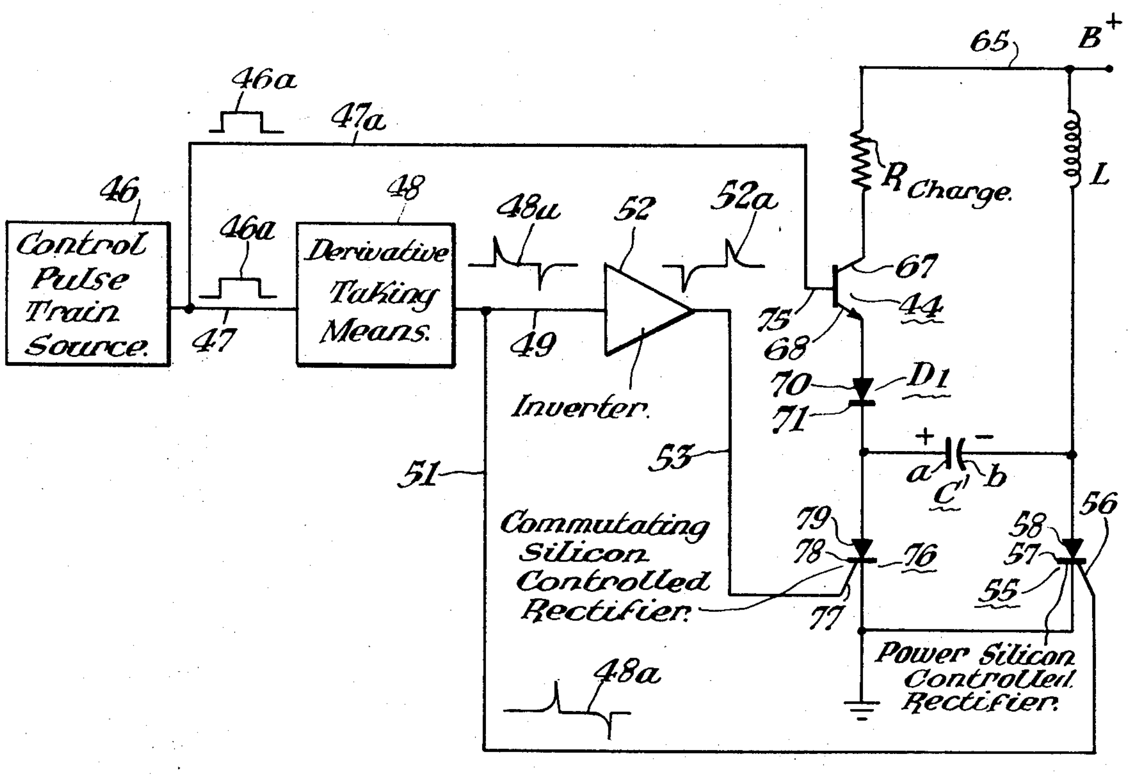
FIG. 2 depicts the controlled current delivery circuit embodying the present invention.
Figure 3:
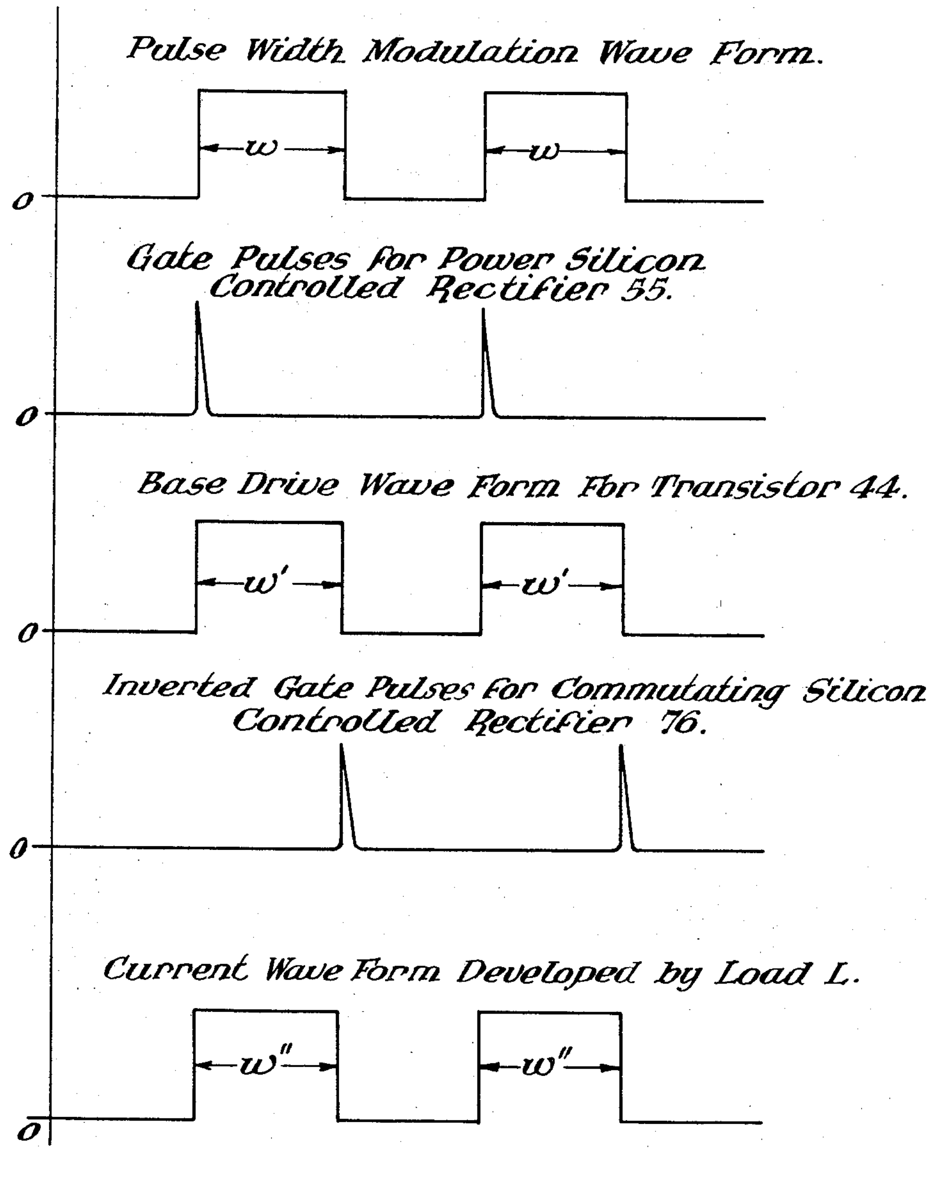

FIG. 3 sets forth a diagram illustrating the sequential gating of the various pertinent components of the controlled current delivery circuit in FIG. 2.

A description of the above embodiments will follow and then the novel features of the invention will be presented in the appended claim.

Figure 1:
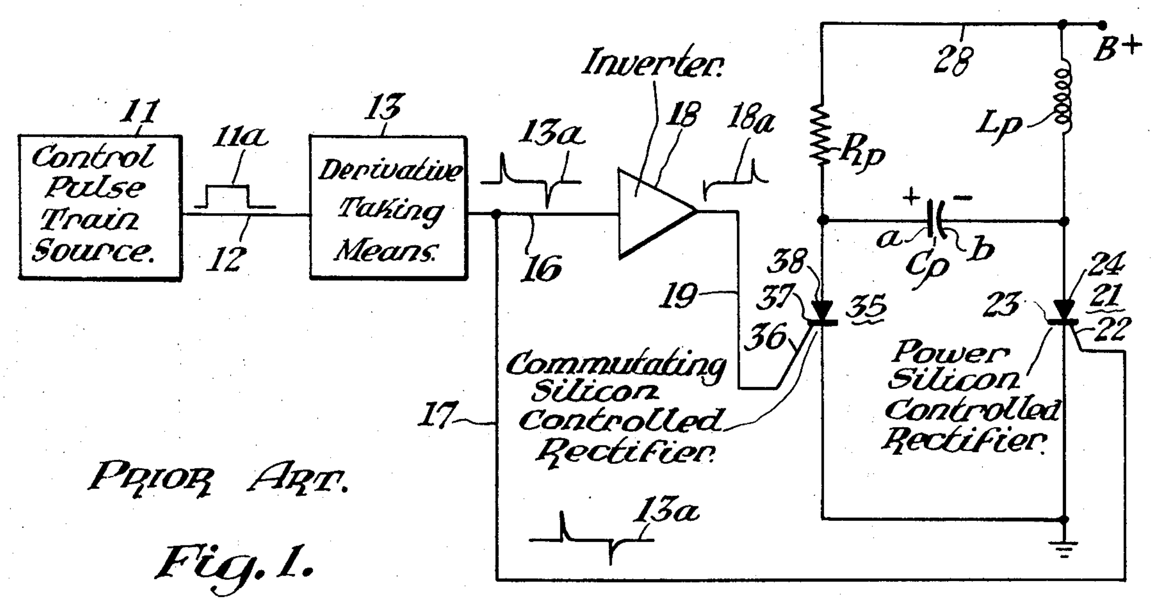
FIG. 1 illustrates a controlled current delivery circuit of the prior art type.

Reference is now made to the drawings and particularly to FIG. 1 which illustrates a prior art type of controlled current delivery circuit. As shown, a control pulse train source 11 delivers a series of control pulses, one of which is characterized by the reference numeral 11a, to a derivative taking means or differentiator 13 over the lead 12. The derivative taking means 13 produces a "spiked" type of output signal which appears on leads 16 and 17, as shown by the reference numeral 13a. The output signal present on lead 17 is directly applied to the gate circuit, namely, gate electrode 22, of the power silicon controlled rectifier 21 so that the power silicon controlled rectifier 21 is turned on when a positive peaked signal is delivered thereto. In the present instance, it will be noted that the power silicon controlled rectifier 21 is gated on by the positive peaked pulse 13a which is derived from the leading edge of the square-wave signal produced by source 11. Hence, with the rectifier 21 conducting, a completed circuit is established from the positive battery terminal b+ of a suitable supply source through a load Lp, which may be a motor winding, anode 24 and cathode 23 of the power silicon controlled rectifier 21 to the grounded terminal of the supply source.

At the same time that power is being delivered to the load Lp, current flows from the positive battery terminal B+ through lead 28 and resistor Rp to thereby charge a capacitor Cp so that plates *a* and *b* are charged with a potential voltage having a polarity as shown in FIG. 1.

As shown, the output signal of the differentiator 13 is also delivered to a suitable inverter 18. The inverter 18 delivers an output signal which is inverted or phase-reversed, as shown by the reference numeral 18a. The output from the inverter 18 is, in turn, applied to the gate electrode 36 of the commutating silicon controlled rectifier 35 by conductor 19. As shown, the positive peaked portion of the inverted pulse 18a is derived from the trailing edge of the square-wave pulse generated by control pulse train source 11. Accordingly, the output of differentiator 13 also effectively controls and turns on the commutating silicon controlled rectifier 35. That is, when the positive peaked pulse, shown by reference numeral 18a, is delivered to the gate electrode 36, the commutating silicon controlled rectifier 35 is rendered conductive. The conduction of the commutating silicon controlled rectifier 35 causes the positive potential charge buildup on capacitor Cp to be "-dumped" through its anode and cathode, 38 and 37, respectively, to ground, and therefore, the positive potential appearing on plate *a* is applied to the cathode 23 of the power silicon controlled rectifier 21 thereby reverse-biasing the power silicon controlled rectifier 21 and turning it off. Hence, the previously mentioned circuit which permitted current to flow through the load Lp is interrupted due to the commutating effect of the capacitor Cp on power silicon controlled rectifier 21. The conduction of commutating silicon controlled rectifier 35 establishes a circuit path from the battery terminal B+ through lead 28 and resistor Rp, through anode 38 and cathode 37 of the commutating silicon controlled rectifier 35 to ground. Under this condition the power silicon controlled rectifier 21 remains cutoff until the next leading edge of the immediate successive pulse is produced by the control pulse train source 11 which once again turns on the power so silicon controlled rectifier 21. During the initial period of conduction of the commutating silicon controlled rectifier 35, a circuit path is established through the load Lp and the commutating silicon controlled rectifier 35 for charging the capacitor Cp in the reverse direction to the polarity shown in FIG. 1. It will be appreciated that the effect of the reverse potential charge on capacitor Cp is to cause reverse-biasing or commutation of the commutating silicon controlled rectifier 35.

However, if an accidental externally caused positive spike or surge voltage appears on the lead 17 during this period of reverse charging of capacitor Cp, the power silicon controlled rectifier 21 would again be rendered conductive. Further, if the capacitor Cp is not fully charged, i.e., if there is not a sufficient amount of potential charge for reverse biasing the commutating silicon controlled rectifier 35, no commutating action will take place, and accordingly, both the power silicon controlled rectifier 21 and the commutating silicon controlled rectifier 35 would remain ON. It will be noted that once both of the silicon controlled rectifiers 21 and 35 conduct, the commutating capacitor Cp is thereafter rendered ineffective since both plates *a* and *b* of the capacitor are held at ground level by the conduction of the silicon controlled rectifiers and no potential charge can be built up on the capacitor Cp. Further, if immediate action is not taken to physically disconnect the power supply, there will be a current buildup in the load Lp such that there exists a danger that the load Lp will be severely damaged or destroyed. It is this type of dangerous current buildup, namely, when both the commutating silicon controlled rectifier and the power silicon controlled rectifier are gated ON, that one wishes to avoid; and thus, it is desirable to employ the controlled current delivery circuit of the present invention for remedying such adverse operation.

Reference is now made to FIG. 2 which illustrates the unique controlled current delivery circuit embodying the present invention. As shown, a control pulse train source 46 similar to that of FIG. 1 delivers a series of positive going modulated square-wave control pulses, one of which is illustrated by the reference numeral 46a, to the leads 47 and 47a. The control pulse present on lead 47 is again shown being delivered to a derivative-taking means or differentiator 48 which produces peaked output pulses on leads 49 and 51. These differentiated output pulses are characterized by the reference numeral 48a. It will be noted that the output pulses on lead 51 are directly applied to the gate electrode 56 of the power silicon controlled rectifier 55 so that the rectifier 55 is normally turned on by the leading edge of the derived positive peaked pulse, shown by reference numeral 48a. When silicon controlled rectifier 55 is turned on, a circuit path is completed from the positive battery terminal B+ of a suitable power supply through a load L, through the anode 58 and cathode 57 of the power silicon controlled rectifier 55, to the grounded terminal of the power supply. Thus, current flows through the load L, which is as previously mentioned may be the winding of an electric motor.

It will be noted that the output signal of the control pulse train source 46 designated by the reference numeral 46a is also delivered to the lead 47a which is directly connected to the base electrode 75 of NPN switching transistor 44 which operates as an energy storage control gate. The positive pulse 46a causes the switching transistor 44 to conduct. It will be appreciated that the period of time that the switching transistor 44 remains conductive is directly determined by the width of the square-wave pulse 46a.

With switching transistor 44 conducting, a circuit path is completed from the positive battery terminal B+ over lead 65, through current-limiting resistor R, through the collector and emitter electrodes 67 and 68, respectively, of switching transistor 44, through anode 70 and cathode 71 of blocking diode $D_1$, to plate *a* of capacitor C and from plate *b* of capacitor C, through anode 58 and cathode 57 of power silicon controlled rectifier 55 to ground. Thus, the capacitor C is charged to a potential voltage having the polarity shown in FIG. 2.

Now when the trailing edge of the square-wave pulse, as shown by numeral 46a, appears in lead 47a the positive biasing potential is removed from the base electrode 75 and, therefore, the switching transistor 44 ceases to conduct. The trailing edge of the square-wave pulse 46a also causes the negative going peaked portion of pulse 48a to be produced on leads 49 and 51. The negative peaked portion of pulse 48a appearing on lead 51 has no effect on the conductive condition of power silicon controlled rectifier 55, but the negative peaked portion of this pulse appearing on lead 49 is delivered to the inverter 52 which results in a phase inversion and causes a positive peaked portion to be developed as shown by reference number 52a.

The following occurs when the trailing edge of the square-wave signal 46a appears on output lead 47 of the control pulse train source 46.

First, the switching transistor 44 will cease to conduct due to the removal of the forward-biasing potential of the base electrode 75. Second, the trailing edge of the pulse 46a results in the positive peaked portion of pulse 52a to be applied by conductor 53 to the gate electrode 77 of the commutating silicon controlled rectifier 76, so that the rectifier 76 is turned on. With the commutating silicon controlled rectifier 76 conducting, the capacitor C will discharge through anode 79 and cathode 78 of the commutating silicon controlled rectifier 76, to ground so that the positive potential charge of plate *a* is effectively applied to the cathode 57 of the power silicon controlled rectifier 55 thereby reverse-biasing the power silicon controlled rectifier 55 and causing it to turn off. Blocking diode $D_1$ will prevent reverse current flow due to the discharging of capacitor C to the switching transistor 44. After the capacitor C becomes fully discharged, it will begin recharging in the opposite direction through the load L and the anode 79 and cathode 78 of the commutating silicon controlled rectifier 76. Accordingly, the polarity across plates *a* and *b* of capacitor C will reverse from that shown in FIG. 2 so that plate *b* now becomes positive while plate *a* becomes negative. Let us assume for the present that no transient surge or voltage appears on the conductor 51, and therefore, the capacitor continues to recharge in the reverse direction. As the capacitor C approaches full charge, namely, the voltage level of the power supply source, the charging rate no longer exceeds the required holding current value for the commutating silicon controlled rectifier 76, so that the commutating silicon controlled rectifier 76 turns off. Accordingly, there is no circuit path through which current can flow through the load L and therefore the load becomes deenergized until the next succeeding positive peaked portion of the pulse 48*a* is delivered on lead 51 due to the appearance of the leading edge of the next square-wave pulse 46*a* on the output lead 47 of the control pulse train source 46.

Upon the appearance of the following square-wave pulse 46*a*, the switching transistor 44 is again turned on, the power silicon controlled rectifier 55 is turned on by the positive peaked portion of pulse 48*a* derived from the leading edge of pulse 46*a* and delivered by the differentiator 48 to lead 51, the capacitor C is discharged through rectifier 55 and recharged in the opposite direction through the conducting transistor 44, resistor R and diode $D_1$, and the load L is again energized through the anode 58 and cathode 57 of the power silicon controlled rectifier 55. Now when the trailing edge of the square-wave pulse 46*a* is delivered to lead 47 the transistor 44 again ceases to conduct due to the removal of the forward-biasing voltage on the base electrode 75. The trailing edge of plate 46*a* also causes the negative peaked portion of pulse 48*a* to be applied to leads 49 and 51. The latter has no effect on gate electrode 56 of the power silicon controlled rectifier 55 while the former is inverted by inverter 52 and appears as a positive peaked pulse 52*a* on lead 53. This positive peaked pulse 52*a* is applied to the gate electrode 77 thereby causing the commutating silicon controlled rectifier 76 to again be turned on. Again the conduction of the commutating silicon controlled rectifier 76 causes the charge on capacitor C to be dumped to ground thereby causing the power silicon controlled rectifier 55 to turn off due to the reverse bias on its anode and cathode, 58 and 57, respectively. After discharging through the commutating silicon controlled rectifier 76, the capacitor C again begins recharging in the opposite direction through the load L and the anode 79 and cathode 78 of rectifier 76. Let us now assume the adverse condition, such as described in regard to the prior art arrangement occurs, that is, an accidental externally caused positive spike appears on the lead 51. This spike is directly applied by the lead 51 to the gate electrode 56 thereby causing the power silicon-controlled rectifier 55 to turn on. If the capacitor C is not fully recharged, the conduction of the power silicon controlled rectifier 55 will equalize the potential charge on plate *b* to that of plate *a*, namely, plate *b* will become grounded through the anode 58 and cathode 57 of the power silicon controlled rectifier 55. Since no holding current is available for the commutating silicon controlled rectifier 76 due to the DC blocking action of the capacitor C and also due to the nonconduction of the transistor 44, the commutating silicon controlled rectifier 76 is turned off. While the conduction of power silicon controlled rectifier 55 permits current to flow through the load L, the capacitor C will not recharge in the polarity direction shown in FIG. 2 due to the nonconduction of switching transistor 44. However, when the next succeeding square-wave pulse 46*a* is produced by the control pulse train source 46, the transistor 44 is rendered conductive and the capacitor C begins to recharge in the direction shown in FIG. 2 so that commutation will occur when the commutating silicon controlled current rectifier 76 is turned on by the inverted positive peaked portion of pulse 52*a* derived from the trailing edge of the square-wave pulse 46*a*. Accordingly, the presently described controlled current delivery circuit embodying the present invention is not adversely affected by the appearance of transient voltages or surge currents as was previously the case in the prior art arrangement.

It will be appreciated that the self-quenching effect of the commutating silicon controlled rectifier 76 positively insures that the controlled current delivery circuit will revert to its normal manner of operation and that the load L will not be destroyed by excessive current caused by the simultaneous conduction of both the commutating and power silicon controlled rectifiers 76 and 55, respectively, due to an externally generated transient. Accordingly, more efficient and reliable operation is realized by employing the unique inventive concept set forth herein.

For the purposes of convenience, it may be of benefit to refer to FIG. 3 which illustrates the various waves that sequentially gate the various pertinent components of the controlled current delivery circuit described in FIG. 2. As shown, the upper line of FIG. 3 illustrates the control pulse width modulation waveform which is delivered to the output leads 47 and 47*a* by the control pulse train source 46 of FIG. 2. It will be appreciated that the pulse width $w$ may be varied, namely, lengthened or shortened, in accordance with the required power demand of the load L.

The next succeeding line of FIG. 3 depicts the spiked gate pulses produced by the differentiator 48. It will be noted that the spikes which are produced by the leading edge of the control pulses delivered to the differentiator 48 are employed for turning on the power silicon controlled rectifier 55.

The next succeeding line of FIG. 3 depicts the base biasing voltage waveform for switching transistor 44. It will be noted that this waveform is taken directly from line 47, namely, the output of the control pulse train source 46 and, therefore, the pulse width $w'$ is of the same length as pulse width $w$. Hence when a pulse ends, switching transistor 44 shuts off.

The next succeeding line illustrates the spiked gate pulses produced by the inverter 52. It will be noted that these positive spikes are products of the negatively produced spikes 48*a* produced by differentiator 48. It will be appreciated that these positive spikes result from the trailing edge of the rectangular pulses 46*a* produced by the control pulse train source 46.

The lower line of FIG. 3 illustrates the current waveform of the load L. It will be noted that the pulse width $w''$ is proportional to the pulse-width of the modulation waveform and, therefore, it will be understood that the pulse-width $w''$ may be selectively varied in accordance with load demands by simply varying the pulse-width of the modulation waveform.

It should also be noted that, while the current waveform of the load L is shown to be ideally a square-wave, there actually exists spikes at the leading and trailing edges of each pulse due to the simultaneous operation of both silicon controlled rectifiers for a very short time at the leading and trailing edges of the control pulses.

It will be understood that while the invention has been described in regard to positive going modulation pulses, a negative-going modulation pulse may be employed in practicing this invention. Under this condition, the switching transistor 44 would be of the PNP-type, and the inverter 52 would be placed in conductor 51 rather than between conductors 49 and 53.

Further, it will be appreciated that while the invention has been illustrated as employing semiconductive devices, the presently described invention is also suitably adapted for to other thermionic devices, such as, vacuum and gas type tubes.

While the invention has been described with reference to a particular embodiment, it is to be understood that other modifications, changes, and variations may be made by those skilled in the art without departing from the spirit of the invention or the scope of the claims.

I claim:

1. A controlled current delivery circuit comprising:
a. a pulse source;
b. a power supply source;
c. a load, the current through which is to be controlled, electrically coupled to said power supply source;
d. a power control gate, a commutating gate and an energy storage means, said power control gate respectively electrically coupled to said pulse source, said load, said power supply source, and said energy storage means, and being enabled to allow said current to pass through said load upon the appearance of a pulse from said pulse source, said commutating gate respectively electrically coupled to said power control gate, said energy storage means, and said pulse source to cause said energy storage means to disable said power control gate whenever said commutating gate is enabled due to the disappearance of said pulse from said pulse source; and
e. an energy storage control gate electrically coupled to said power source and said pulse source for allowing the storage of energy in said energy storage means and for causing said commutating gate to be disabled thereafter.

2. The controlled current delivery circuit of claim 1, wherein said pulse source has a variable pulse width dependent on the amount of current to be passed through said load.

3. The controlled current delivery circuit of claim 2, wherein said pulse source includes in combination therewith a differentiating means and a control pulse train source:
said differentiating means having an output which is directly coupled to said power control gate to thereby enable said power control gate whenever said pulse appears; and
said differentiating means output also electrically coupled through an inverter means, to said commutating gate to thereby enable said commutating gate whenever said pulse disappears.

4. The controlled current delivery circuit of claim 1, wherein said power control gate is a silicon controlled rectifier.

5. The controlled current delivery circuit of claim 1, wherein said commuting gate is a silicon controlled rectifier.

6. The controlled current delivery circuit of claim 1, wherein said energy storage means is a capacitor.

7. The controlled current delivery circuit of claim 1, wherein said power supply source is a direct current power source.

8. The controlled current delivery circuit of claim 1, wherein said energy storage control gate is a switching transistor having its base electrode electrically coupled to said pulse source to thereby allow said switching transistor to also be enabled whenever said pulse appears and to be disabled whenever said pulse disappears.

9. The controlled current delivery circuit of claim 8, wherein a diode is interposed between the emitter electrode of said switching transistor and said energy storage means for preventing reverse current flow to said switching transistor during passage of said storage of energy when said commutating gate is enabled at the end of said pulse.

10. The controlled current delivery circuit of claim 9, wherein a resistor is interposed between said power source and the collector electrode of said switching transistor for limiting the amount of current flow through said collector-emitter electrodes of said switching transistor.

11. A controlled current delivery circuit which includes in combination:
a. a direct current power source having a first and a second terminal;
b. a load, the current through which is to be controlled electrically coupled to said first terminal of said direct current power source;
c. a control pulse train source for producing a rectangular pulse having a selectively variable pulse width dependent on the amount of current to be passed through said load;
d. a differentiating means, electrically coupled to said control pulse train source for producing spiked pulses at the leading and trailing edges of said rectangular pulse;
e. an inverting means electrically coupled to said differentiating means for inverting said spiked pulses;
f. a commutating silicon controlled rectifier, having a gate, an anode, and a cathode electrode, said gate electrode of said commutating silicon controlled rectifier electrically coupled to said inverting means, and said cathode electrode of said commutating silicon controlled rectifier electrically coupled to said second terminal of said direct current power source;
g. a power silicon controlled rectifier, having a gate, an anode, and a cathode electrode, said gate electrode of said power silicon controlled rectifier electrically coupled to said differentiating means, said anode electrode of said power silicon controlled rectifier electrically coupled to said load, and said cathode electrode of said power silicon controlled rectifier electrically coupled to said second terminal of said direct current power source;
h. a switching transistor having an input and an output circuit, said input circuit of said switching transistor electrically coupled to said control pulse train source;
i. a blocking diode having an anode and a cathode electrode, said anode electrode of said blocking diode electrically coupled to said output circuit of said switching transistor;
j. a commutating capacitor having first and second plates, said first plate of said commutating capacitor respectively electrically coupled to said cathode electrode of said blocking diode and said anode electrode of said commutating silicon controlled rectifier, said second plate of said commutating capacitor electrically coupled to the junction of said load and said anode electrode of said power silicon controlled rectifier; and
k. and a current-limiting resistor interposed between said first terminal of said direct current power source and said output circuit of said switching transistor.

12. A control circuit for a load to be supplied with current from a power supply source wherein a first silicon controlled rectifier has its output circuit connected in series with said load and a second silicon controlled rectifier has its output circuit electrically coupled to a commutating capacitor, said first and second silicon controlled rectifiers having their input circuits electrically connected to a pulse source so that current flows through said load when a pulse is delivered to the input circuit of said first silicon controlled rectifier and so that current to said load is interrupted when a pulse is delivered to said second silicon controlled rectifier, characterized by the fact that there is combined with said first and second silicon controlled rectifiers a switching transistor having an input circuit electrically coupled to said pulse source and having a output circuit electrically interconnected with the output circuit of said second silicon controlled rectifier and electrically coupled through said capacitor to said output circuit of said first silicon controlled rectifier and for causing self-quenching of said second silicon controlled rectifier thereby preventing excessive current from flowing through said load due to simultaneous conduction of said first and second silicon controlled rectifiers.

PO-1050
(5/69)

UNITED STATES PATENT OFFICE
CERTIFICATE OF CORRECTION

Patent No. 3566157 Dated Feb. 23, 1971

Inventor(s) Lincoln Ong

It is certified that error appears in the above-identified patent and that said Letters Patent are hereby corrected as shown below:

Claim 12, Column 8, Line 66 after rectifier insert"for permitting commutation of said first silicon controlled rectifier"

Signed and sealed this 23rd day of November 1971.

(SEAL)
Attest:

EDWARD M.FLETCHER,JR.
Attesting Officer

ROBERT GOTTSCHALK
Acting Commissioner of Patents